Sept. 5, 1967  W. A. SCHLAGEL, JR., ET AL  3,339,691
GRAIN DISTRIBUTOR

Filed July 21, 1965  3 Sheets-Sheet 1

INVENTOR.
WILLIAM A. SCHLAGEL JR.
ALFRED H. HUEHN
BY Adams & Cwayna
ATTORNEYS

Sept. 5, 1967  W. A. SCHLAGEL, JR., ET AL  3,339,691
GRAIN DISTRIBUTOR
Filed July 21, 1965  3 Sheets-Sheet 2
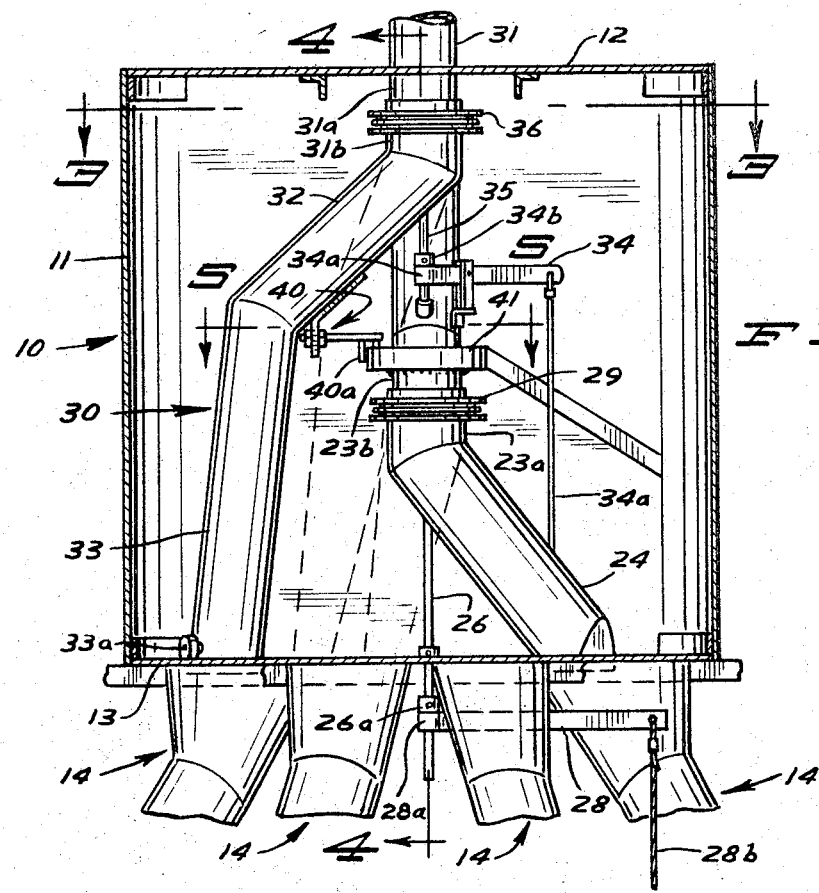
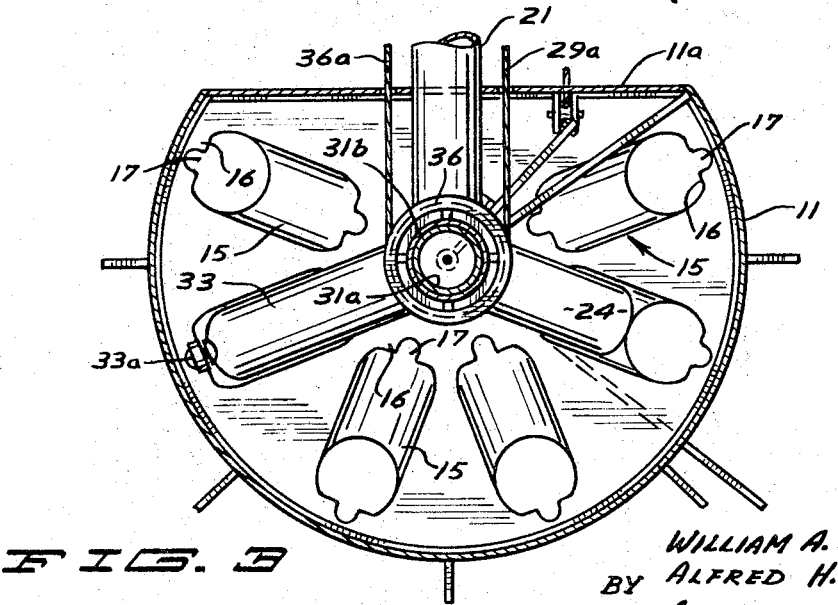
INVENTOR.
WILLIAM A. SCHLAGEL JR.
BY ALFRED H. HUEHN
Adams & Cuayna
ATTORNEYS

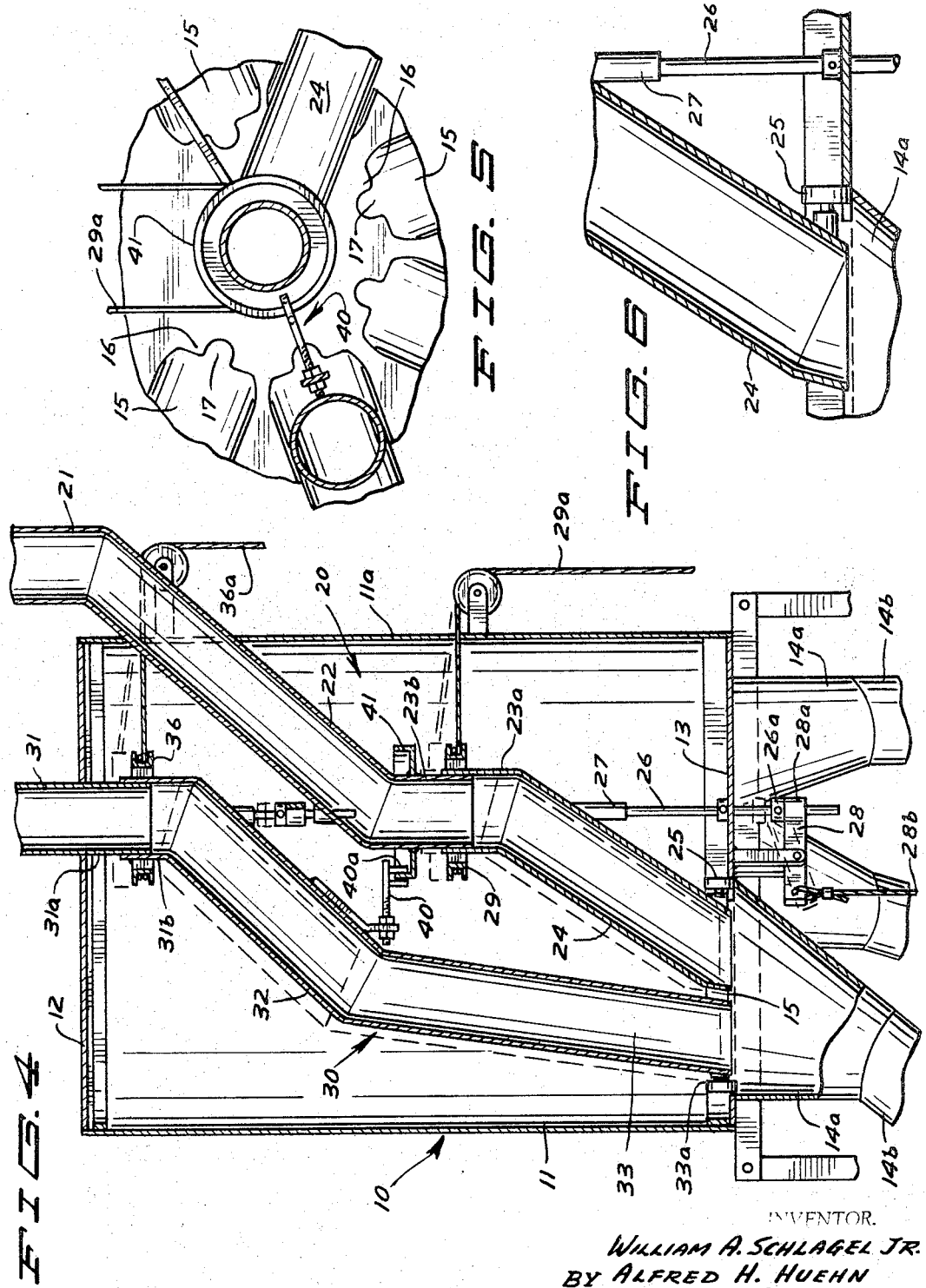

United States Patent Office 3,339,691
Patented Sept. 5, 1967

3,339,691
GRAIN DISTRIBUTOR
William A. Schlagel, Jr., Minneapolis, and Alfred H. Huehn, Cambridge, Minn., assignors to Schlagel, Inc., Cambridge, Minn., a corporation of Minnesota
Filed July 21, 1965, Ser. No. 473,648
5 Claims. (Cl. 193—23)

This invention relates generally to grain distributors and the like and more particularly to a grain distributor designed to receive grain from a multiplicity of elevator devices and to direct the grain through a plurality of intermediate transfer tubes to a plurality of selected grain storage bins.

The invention further further contemplates the proper positioning of the intermediate transfer tubes with respect to the discharge spouts of the distributor to insure delivery of the grain to a proper storage bin.

In the past various grain distributors have been available. However, one of the main problems with the distributors presently on the market is their lack of capacity in that they are generally arranged to feed from one elevating apparatus at a time into any one of a number of bins. It is contemplated through this invention to provide a means for distributing grain from a plurality of such elevating devices into either individual storage bins or into the same storage bin.

The device as further provided herein provides a positive locating means for the transfer tubes within the distributor which transfer tubes are designed to receive the grain from the elevating apparatus and direct the grain into any one of a number of discharge spouts which are directly connected to the grain storage bins. Applicant's concepts permit proper locationing of these intermediate transfer tubes through what may be termed a positive drop-in locating system. Heretofore, it has been almost impossible to properly prelocate these intermediate transfer tubes with respect to the discharge spouts and as a result much time was lost in the proper location of these transfer tubes and time has likewise been lost due to grain being spilled over into an unselected storage bin.

The apparatus of this device contemplates remote automatic locating of intermediate transfer tubes within the distributor and further provides a plurality of such intermediate transfer tubes which may be mounted in a single unit. By providing such a plurality of transfer tubes it is of course possible to receive grain from a number of elevating units and thus the time and equipment necessary to effect the transfer of grain to the storage bin will be substantially reduced.

The positioning device contemplated herein for the intermediate transfer tubes provides not only a positive positioning structure but also provides a supporting and guiding element for the transfer tubes between such positioning points. The weight and length of the intermediate transfer tubes due to the size of most grain distributors is of course an important factor and by providing an intermediate tube guiding system, applicant has provided a unit which will be substantially long life in that there will not be any undue strain on the intermediate tubing system.

It is therefore an object of applicant's invention to provide a grain distributor or a distributor which may be used for transfering granular material from a delivering elevating apparatus to a plurality of individual storage bins.

It is a further object of applicant's invention to provide a grain distributor having a plurality of transfer tubes therein each of which transfer tube is designed to receive material from an elevating apparatus and to distribute this material into either individual or the same discharge spouts to effect the delivery of the material into a selected storage bin.

It is a further object of applicant's invention to provide a grain distributor wherein positive locating means are provided with respect to the distributor discharge spouts such that intermediate transfer tubes within the distributor will be positively and easily located with respect to these spouts.

It is a further object of applicant's invention to provide a support system and guiding system for the intermediate tubes of a grain distributor such that the discharge end of such tubes will be supported intermediate their spout locating positions to prevent unnecessary wear and strain on the tubular material.

It is a further object of applicant's invention to provide remote positioning and driving means for an intermediate transfer tube of a grain distributor such that the location thereof may be properly achieved from without the unit.

These and other objects and advantages of my invention will more fully appear from the following description made in connection with the accompanying drawings, wherein like reference characters refer to the same or similar parts throughout the several views, and in which:

FIG. 2 is a substantially vertical cross section taken along line 2—2 of FIG. 1;

FIG. 3 is a horizontal cross section taken substantially along line 3—3 of FIG. 2;

FIG. 4 is a vertical section taken substantially along line 4—4 of FIG. 2;

FIG. 5 is a horizontal cross section taken substantially along line 5—5 of FIG. 2; and FIG. 6 is a section of the discharge end of a transfer tube drawn to an enlarged scale.

Figure 1:
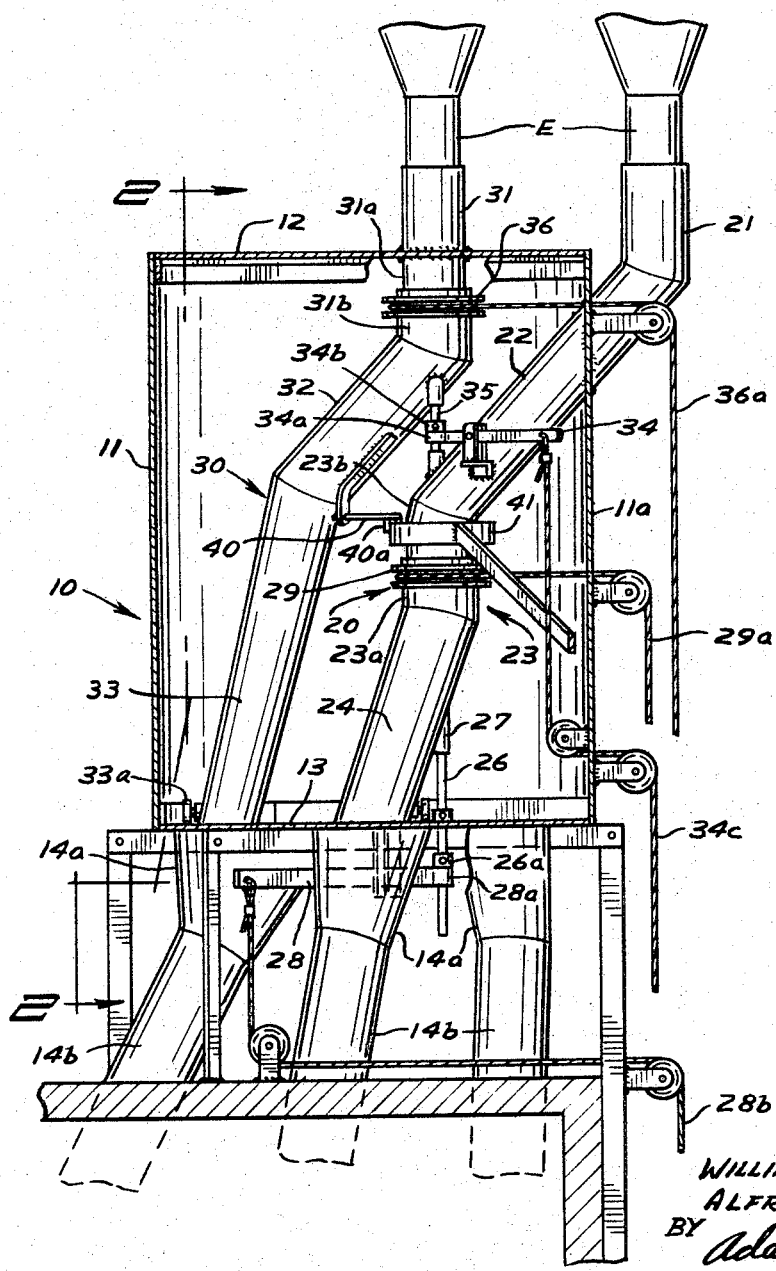
FIG. 1 is a cross section taken through a typical installation of a grain distributor illustrating the distributor embodying the concepts of applicant's invention.

In accordance with the accompanying drawings as particularly illustrated in FIG. 1 a grain distributor generally designated 10 is designed to receive grain or granular material from an elevating device such that the material will be fed through gravity downward and may be directed into one of a plurality of storage bins. The lowermost portions of the elevator legs are designated E in FIG. 1 and the grain flows downwardly therethrough into the grain distributor 10 where it is directed through an intermediate transfer tube system into a plurality of discharge spouts which spouts are directed respectively into an individual storage bin.

In the form shown, the grain distributor 10 comprises a substantially cylindrical housing member having a cylindrical side 11 and upper 12 and lower 13 closing plate on the respective ends thereof. In the form shown, the cylindrical structure is substantially reduced as illustrated in FIG. 3 to provide a flat side 11a continuing from the substantially cylindrical portion 11. Side 11a is so cut to provide a means of positioning the distributor 10 in close proximity to the elevator leg sections. It is obvious of course that this particular distributor shape would not be necessary in all applications but it is conceived by applicant that this structure would be highly effective without requiring as much room as is normally required by the standard conical or full cylindrical distributors. As shown in FIG. 3 this offset cut portion 11a displaces the axis of the cylindrical section more closely to the flat section 11a and when reference is made hereinafter about the transfer tubes revolving about the axis of the cylinder, or spouts and portions of the distributor being equally displaced about the unit, reference is made to this established axis and not to the possible actual center of the unit.

Lower plate 13 is in the form shown provided with a plurality of discharge spouts each spout designated in its entirety 14. These spouts 14 are equally displaced about the surface of the plate 13 and in the form shown comprise a substantially large frusto-conical receiving portion 14a delivering down into a substantially uniform and smaller discharge portion 14b. The frusto-conical section 14a is provided such that both of the intermediate transfer tubes may be received into any one of the openings 15 through plate 13 as illustrated in FIG. 4. This structure of course permits double discharge into any one storage bin or selective discharge of each of the transfer tubes into a separate bin.

The spout openings through plate 13 are best illustrated in FIGS. 3 and 5 and are designated in their entirety 15. As illustrated, these openings 15 are substantially elliptical in shape arranged radially outward from the established axis and each having a locating cutout on the outward and inwardly disposed ends thereof. These locating devices generally comprise a reduced portion 16 of the openings 15 with a locating groove or wheel receiving aperture formed centrally 17 thereof. Receiving grooves 17 are designed to receive certain guiding and supporting structures arranged on the ends of each of the transfer tubes and as illustrated this guiding structure is in the form shown a small roller member. This roller member will be described more substantially hereinafter when an individual description of the transfer tubes is made although it should suffice at this point to say that when a transfer tube is positioned properly with respect to the spout opening 15, the roller member will be received within the opening 17 to properly position the discharge end of the transfer tube therein. This receiving aperture 17 also permits the discharge ends of the transfer tubes to be received within the openings 15 and extend into spouts 14 such that an overlapping relation exists between the discharge end of the transfer tube and the spouts 14 such that all the material will pass directly therein without going through an unguided or gapped portion before being received into the spouts 14. Likewise these roller members on the ends of the transfer tubes will serve to guide and support the ends of the transfer tubes between such openings 15 at which time these roller members will be supported by the uncut portions of plate 13.

Although both of the intermediate transfer tubes within the distributor 10 are substantially identical in their operation, it will be necessary to entirely describe each of them separately.

A lower transfer tube is, in the form shown, designated 20 and this tube consists essentially of a receiving end 21, intermediate section 22, a sliding connector section 23 and a discharge end 24. The roller member at the bottom end of the discharge section 24 is designated 25 and is of course rotatably connected to the innermost side of the discharge section 24. Upper receiving end 21 and the intermediate section 22 are in the form shown rigidly connected to the side 11a of the unit 10. The size of the receiving tube 21 is slightly larger than the size of the elevator discharge end E such that the material will be transferred internally into the intermediate transfer tube 20.

Intermediate sliding section 23 in the form shown as best illustrated in FIG. 4 consists of telescoping units 23a–23b with the uppermost portion 23b receivable into the bottom portion 23a. In this form it is possible to shift the lower discharge portion 24 along with its connective rotatable guide member 25 upwardly such that it may pass between the spout openings 15 on plate 13 and subsequently be dropped into the next required spout opening 15 with the roller 25 received into aperture 17 to discharge into the proper storage bin.

This lift and shifting effect is gained by a double mechanical operation. The lifting effect will be explained initially. As illustrated in FIGS. 1, 2 and 4 a first rod member 26 is received into a boss 27 on the lower side of discharge member 24. This rod 26 is actually established on the axis of the unit as herebefore discussed. Rod member 26 extends downwardly through the bottom plate member 13 and is connected to a rotatably mounted lever member 28. Connective end 28a of lever member 28 is rotatably received about rod 26 to permit rotation of the discharge portion 24 into the proper spout opening 15 but is so arranged with rod 26 through a capturing element 26a mounted directly thereabove that should the lever member 28 be pulled downwardly through connecting line 28b, rod member 26 will be forced upwardly telescoping the units 23a–23b and thus raising the discharge end 24 and roller 25. This upward movement as illustrated in the dotted position of FIG. 4 will shift the discharge end 24 of this intermediate conduit 23a upwardly so that it may be rotated about the axis of rod 26 to place the discharge end in its next desired position to discharge into a desired storage bin opening 15.

In order to obtain the rotative effect it should be noted that a pulley or sheave member 29 is provided on the lower telescoping section 23a and is provided with a control rope or wire designated 29a encircling pulley 29 and extending outwardly from the unit 10. This arrangement permits the discharge end 24 when it is displaced upwardly through actuated lever 28 to be rotated by pulling on the appropriate rope 29a permitting the entire discharge unit including telescoping section 23a and the discharge portion 24 to rotate about the upper stationary telescoping section 23b.

The other internal transfer tube is designated in its entirety 30 and consists again of a receiving end 31 substantially larger than the discharge end of the elevating structure E and extending upwardly through plate 12 to receive material internally from the elevator. This receiving end 31 is fixedly attached to the upper plate 12 of the unit. The lower portion of this receiving end designated 31a is the stationary and smaller telescoping portion of a telescoping unit of the transfer conduit 30. The lower portion of the transfer unit consists of a second telescoping section designated 31b and a pair of intermediate sections designated respectively 32 and 33 which section 33 serves as the discharge portion of this intermediate transfer unit 30. As in the case of the first intermediate transfer conduit, a rotatable guide member in the form of a roller 33a is provided on the outward extending side of this transfer conduit 30.

In order to obtain the proper elevation of this intermediate transfer of conduit 30 in order to permit rotational placement thereof lifting lever member designated 34 is rotatably attached to the stationary portion 22 of the first conduit 20. The actuating end of this lever 34a is rotatably mounted about an axial shaft 35 which shaft is in axial alignment with the aforementioned shaft 26. The bottom portion of shaft 35 is again attached to the stationary conduit 22 of transfer conduit 20 and is mounted with respect to the intermediate section 32 of the second transfer conduit 30 to permit rotation of section 32 thereabout. A capturing element 34b is provided in overlying position with respect to the end 34a of lever 34 such that when the lever 34 is rotated about its pivot point through the drive wire or rope 34c which again extends outwardly through the cylindrical body member, the entire section consisting of the lower telescoping portion 31b, intermediate section 32 and discharge end 33 will be shifted upwardly as illustrated by the dotted lines in FIG. 4. This shifting upwardly of course will permit the wheel member 33a to be lifted out of the receiving groove 17 in the spout opening 15 such that the unit may be rotated into a next desired position.

In this case the rotational effect is again achieved in the form shown by providing a pulley or sheave member 36 around the periphery of the lower telescoping portion 31b of conduit 30 and a control wire or rope 36a extends outwardly from the unit to permit the rotation to be accomplished.

An additional guiding member is provided with respect to the second transfer conduit 30. In the form shown a bifurcated finger section designated in its entirety 40 is arranged in inwardly disposed relation with respect to the intermediate section 32 of conduit 30. A receiving flange portion designated 41 is mounted on the stationary upper telescoping portion 23b of the transfer conduit 20 and this upstanding flange is provided to be received between downwardly extending bifurcations 40a of the bifurated guide member 40. In this manner as the conduit 30 is rotated the end 33 thereof is effectively guided in a circular path through contact of the bifurcations 40a with the flange 41. Flange portion 41 is a stationary guide as it is mounted on a stationary portion of the conduit 20. Likewise the length of the bifurcations 40a must be such that when the upper portion of unit 30 is elevated through action of lever 34, the bifurcations must still maintain proper contact with the flange 41. This guiding structure insures the rotation of the discharge end 33 in proper relation to be received in the outermost portions of the spout openings 15.

The apparatus as described affords a series of mechanical motions such that two completely independent intermediate transfer tubes within a distributor may be positioned with respect to the same or individual receiving openings. Positioning is achieved in both units through the upward movement provided in the telescoping sections and through the rotational effect produced with the second control member of each unit, this control member being the ropes or similar means controlling and attached to the rotational driving pulley or sheave on each of the transfer tubes.

Effectively, the principle involved with the two intermediate transfer tubes provides a means for more rapidly discharging and directing the grain which is delivered to the distributor. This distrbution as before stated is primarily a gravity flow and it is therefore necessary that none of the portions of the internal conduits are at an angle of less than approximately 45° or less than an angle which permits flow. If such a lesser angle were achieved, the grain would not properly flow therethrough and the unit would not be in proper functioning condition.

The apparatus as illustrated could be used either independently or as illustrated in combined form wherein at least two such internal tubes are provided. The mechanical apparatus to guide any of the tubes is of course identical and includes the upward lifting unit and the rotational driving unit. The upward and downward mechanical apparatus further provides the insurance that the grain will be delivered into the exact storage bin in that the transfer tube is actually partially received within the proper transfer spout opening before such transfer is effected. In this manner all grain passing through the intermediate conduits 20 and 30 is directed internally of a receiving spout and is not free to possibly flow over the surface of the bottom plate 13 into an adjacent spout opening.

As previously stated, the wheels 33a and 25 at the lower portion of the discharge ends 24 and 33 of the individual transfer conduits are designed to be received within the slots 17 provided in the spout openings 15. This structure insures proper positioning of the conduit with regard to an opening 15 and the operator will immediately know that should the lever which he has actuated to lift the conduit out of a prior used spout opening 15 not be returned to its lowered position that the conduit is not in proper position and thus he will not initiate the transfer of grain. When the lever member does return to its uppermost position he is immediately notified that the rotational function has been completed and that the wheel and associated discharge end of the conduit is properly positioned with respect to the spout opening. With this system it is not necessary to provide any calibration of the individual units to determine location but rather when the roller member or whatever member is used as a rolling and guiding structure is received into the proper opening with regard to each of the discharge spouts proper positioning has been achieved. It would not of course be necessary to provide these receiving slots 17 directly within each of the grain spout openings 15 but this is a desirable location for the aspect of conserving on the available room within the unit.

It should be obvious that applicant has provided a unique mounting apparatus for providing a plurality of intermediate discharge and directing conduits within a grain distributor such that these conduits may be positively positioned with respect to the discharge outlets from the distributor.

To those skilled in the art and knowledgeable in the grain transmission field it should be obvious that by providing the intermediate conduits to fit directly into the discharge spouts a certain amount of dust accumulation will be eliminated. Further, even though some dust will accumulate within the grain distributor housing on the bottom plate thereof, the system of guides running on this plate surface will actually clear their own track through this dust and will likewise clear their own locating slots. This clearing of course will eliminate the necessity of cleaning the distributor at frequent intervals.

It should further be obvious that applicant has provided a structure which by providing a substantially cutoff cylindrical body consumes and requires less room than a full cylindrical body distributor thus enabling the user to install the unit in a substantially small area and particularly permitting the user to make such installation in close relation to the legs of an elevating apparatus.

It will, of course, be understood that various changes may be made in the form, details, arrangements and proportion of parts without departing from the scope of the invention, which generally stated consists in the matter set forth in the appended claims.

What I claim is:

1. A grain distributor for use in receiving grain from an elevating apparatus and discharging the same into selected storage bins comprising:
   (a) a housing member having a plurality of discharge spouts arranged in substantially planar relation in the lower end thereof which discharge spouts are arranged to deliver grain into individual storage bins;
   (b) a pair of grain transfer conduits arranged within said housing each having a receiving end to receive grain from an elevating apparatus a discharge end arranged to deliver grain into a selected discharge spout;
   (c) a substantially vertical telescoping section provided in each of the transfer conduits arranged axially of said housing, the respective upper ends of said telescoping sections being fixedly attached to the housing permitting full circular rotation of the lower discharge ends therearound;
   (d) the discharge end of a lower of said conduits being radially spaced more closely to said axis than the discharge end of the upper of said conduits such that the units will be free to rotate;
   (e) means for independently actuating each of said telescoping sections of said transfer conduits to shift the respective discharge ends thereof and permit placement thereof partially within the discharge spouts; and
   (f) means for independently rotating each of said discharge ends to position the same for discharge into any one of said discharge spouts.

2. The structure set forth in claim 1 and a generally arcuate flange member arranged around the stationary portion of the lower transfer conduit providing a guide member and guide means cooperatively connected to said guide member mounted on the lower rotative portion of the upper conduit whereby the discharge end thereof is restrained against radially inward and outward movement there is guided and maintained in an arcuate path around said lower conduit.

3. The structure set forth in claim 1 wherein said discharge spouts are arranged in radially spaced relation underlying the discharge ends of both of said conduits and are of such a size to receive the ends thereof simultaneously.

4. The structure set forth in claim 3 and said discharge spouts having radially inwardly and radially outwardly extending apertures and positive positioning and locking means receivable into said apertures arranged respective on the radially inward portion of the discharge end of the lower of said conduits and radially outwardly on the upper of said discharge conduits.

5. The structure set forth in claim 4 wherein said positive positioning and locking means includes a guiding and supporting roller member to normally support the discharge ends on said housing between spout openings.

References Cited
UNITED STATES PATENTS

| | | | |
|---|---|---|---|
| 993,167 | 5/1911 | Hoff | 193—23 |
| 1,187,324 | 6/1916 | Ibberson | 193—23 |
| 2,243,840 | 6/1941 | Delivuk | 193—23 |
| 2,799,378 | 7/1957 | English | 193—23 |

GERALD M. FORLENZA, *Primary Examiner.*

ROBERT G. SHERIDAN, *Examiner.*